(12) United States Patent
Sawamura et al.

(10) Patent No.: US 6,280,890 B1
(45) Date of Patent: Aug. 28, 2001

(54) COLOR FILTER AND COLOR LIQUID CRYSTAL DISPLAY DEVICE

(75) Inventors: Masashi Sawamura; Kenichi Fujita; Takeo Sugiura; Takao Taguchi; Eriko Nagata, all of Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/644,972

(22) Filed: Aug. 24, 2000

(30) Foreign Application Priority Data

Aug. 27, 1999 (JP) .................................................. 11-240802

(51) Int. Cl.⁷ ........................ G02F 1/1337; G02F 1/1335; G02B 5/20
(52) U.S. Cl. .................................. 430/7; 349/70; 349/106
(58) Field of Search ............................... 430/7; 359/891, 359/70; 349/106

(56) References Cited

U.S. PATENT DOCUMENTS 5,821,016 * 10/1998 Satoh et al. ............................... 430/7
5,827,626 * 10/1998 Kobayashi et al. ...................... 430/7

FOREIGN PATENT DOCUMENTS 1-114884 * 5/1989 (JP) .
7-228881 * 8/1995 (JP) .
7-258592   10/1995 (JP) .

* cited by examiner

*Primary Examiner*—John A. McPherson
(74) *Attorney, Agent, or Firm*—Nixon & Vanderhye (57) ABSTRACT

A color filter includes at least one blue filter segment, at least one red filter segment, and at least one green filter segment, and has a thickness of from 1 to 2.5 μm. The blue filter segment is prepared from a blue-colored composition containing a colorant carrier selected from the group consisting of a transparent resin, a precursor of a transparent resin and a mixture thereof, and a blue colorant dispersed in the carrier. The blue colorant consists of a copper phthalocyanine pigment and a dioxazine violet pigment. The content of the dioxazine violet pigment is 0.5% to 7% by weight based on the total weight of the blue colorant. There is also disclosed a color liquid crystal display device having the color filter, and a backlight unit provided with a three-band fluorescent lamp as a light source and exhibiting a specific light intensity distribution.

7 Claims, 2 Drawing Sheets

COLOR FILTER AND COLOR LIQUID CRYSTAL DISPLAY DEVICE

CROSS-REFERENCE TO RELATED APPLICATIONS

This application is based upon and claims the benefit of priority from the prior Japanese Patent Application No. 11-240802, filed Aug. 27, 1999, the entire contents of which are incorporated herein by reference.

BACKGROUND OF THE INVENTION

The present invention relates to a color filter and a liquid crystal display device including a combination of the color filter and a specific backlight unit.

A color liquid crystal display device basically has a first transparent substrate having a first transparent electrode layer formed thereon, a second transparent substrate having a second transparent electrode layer formed thereon, and a liquid crystal layer filled between the first and second transparent substrates. A color filter layer is generally interposed between the second transparent substrate and the second transparent electrode layer. A first polarizer and a second polarizer are disposed outside the first and second transparent substrates, respectively. A backlight unit having a backlight source is disposed outside the first polarizer.

In the operation of such a liquid crystal display device, the electric voltage applied across these first and second transparent electrode layers is adjusted at every pixel so as to control the degree of polarization of light from the backlight unit which has passed through the first polarizer. In this way, the quantity of light passing through the second polarizer is controlled in performing the display of the display device.

Therefore, the emission spectrum of the backlight and the spectral characteristics of the color filter are important factors in the determination of the color characteristics of the color liquid crystal display device.

A pigment dispersion type color filter, which is excellent in various resistances such heat resistance and light resistance, has been conventionally employed as a color filter. On the other hand, a backlight unit having, as a light source, a three-band fluorescent lamp (hereinafter sometimes referred to as a three-band lamp), which is excellent in color rendering property, has been extensively employed. Due to the development of these pigment dispersion type color filter and backlight unit exhibiting excellent color rendering property, the color liquid crystal display device has been widely placed on the market as a liquid crystal color television, a display device for car navigation system, a liquid crystal display-integrated notebook personal computer, etc. Furthermore, by taking advantages of the color liquid crystal display device in terms of energy saving and space saving, the color liquid crystal display device is now increasingly employed as a monitoring device for a desktop personal computer, and hence is now noticed as a substitute display device for the conventional CRT monitoring device.

However, at present, the display performance of the CRT is still superior to that of the liquid crystal display device. In particular, it is still failed to develop a liquid crystal display device which meets the EBU (European Broadcasting Union) Standard, which is a European standard for the display colors of the CRT. Therefore, the achievement of this standard is the key to a big propagation of the liquid crystal display device in the field of television or multimedia industries.

In the operation of a color television, the configuration, movement and hue of an image subject are reproduced on a picture screen through a sequence of processes, i.e. (1) picturing (using a color camera); (2) image transmission; and (3) image reproducing (using an image-receiving device). Therefore, the image transmission system of image signals including the hue is standardized. One of representative image transmission systems is NTSC (National Television System Committee) system, which is adopted, as a television broadcasting system, mainly in the U.S.A., Canada and Japan. On the other hand, in European countries, the image transmission system and standards are determined by the EBU.

The factor which determines the color-reproducing zone in a color television is the chromaticity of three primary colors (display primaries) of the receiver unit, so that the spectral characteristics which a color camera should have will be also determined by this chromaticity. According to the NTSC system, the image-receiving side three primary colors are stipulated with respect to the chromaticity coordinates x and y in the XYZ color specification system as follows:

Red: x=0.67; y=0.33
Green: x=0.21; y=0.71
Blue: x=0.14; y=0.08

On the other hand, according to the EBU Standard, the image-receiving side three primary colors are stipulated as follows:

Red: x=0.64; y=0.33
Green: x=0.29; y=0.60
Blue: x=0.15; y=0.06

Note that $x=X/(X+Y+Z)$; $y=Y/(X+Y+Z)$; and X, Y and Z are tristimulus values in the XYZ color specification system.

The chromaticity of the color liquid crystal display device which is actually employed now however is based on the NTSC system. As mentioned above, there is no liquid crystal display device put to practical use which satisfies the chromaticity stipulated by the EBU Standard. Specifically, as far as red and green colors are concerned, it is relatively easy to achieve the EBU Standard by using color filters prepared from conventional pigment dispersion type colored compositions in combination with a backlight from a conventional three band lamp. With respect to blue however, there is a problem that if the EBU Standard about blue color is to be achieved by using a blue color filter prepared from a conventional blue-colored composition containing copper phthalocyanine pigment in combination with a backlight from a conventional three band lamp, the film thickness of the blue color filter must be increased to a considerably large extent. Since the film thickness of the usually used color filters is generally in the range of 1 to 2.5 $\mu$m, such an increase in film thickness of the blue color filter is not practical.

More specifically, if a blue color filter which is capable of satisfying the EBU Standard is to be formed by making use of the conventional blue-colored composition for the purpose of manufacturing a color liquid crystal display comprising a backlight unit having, as a light source, the conventional three band lamp, the film thickness of the blue color filter is required to be increased to 5 to 9 $\mu$m. This is inappropriate for the following reasons.

Generally, if the thickness of the color filter is too thin, a sufficient chromaticness can not be obtained. On the other hand, if the thickness is too thick, the shape of the patterned filter is degraded. In the case of using a light-sensitive pigment-dispersed resist, the thick filter requires a prolonged time for dissolving and removing the portions not photo-cured, with the result that the periphery of the pattern is laterally etched away, degrading the linearity. Further, a light-sensitive pigment-dispersed resist itself has a large light absorption capacity. Therefore, the lower portion of the applied resist tends to remain uncured when the applied resist is exposed to light in patterning because the light does not sufficiently reach the lower portion. Thus, the thickness of the uncured portion is increased when the thickness of the applied resist is increased, bringing about a larger amount of lateral etching. As a result, the cross-section of the resultant filter becomes inversely tapered. If the color filter has the inversely tapered cross-section, a transparent electrode formed thereon tends to become discontinuous, resulting in a display failure. Further, if the first color filter segment or the second color segment has the inversely tapered cross-section, a subsequently formed color filter segment tends to become nonuniform. When the exposure time is shortened to suppress the lateral etching, the unexposed portion is not sufficiently removed, leaving a residue, which allows only small latitude of development. For these reasons, an appropriate film thickness of the color filter is 1.0–2.5 µm, more suitably 1.0–2.0 µm.

BRIEF SUMMARY OF THE INVENTION

Therefore, an object of this invention is to provide a color filter having a blue filter segment capable of satisfying the chromaticity coordinates x and y for blue color in the EBU Standard with a film thickness of 1 to 2.5 µm, which can not be attained by using the conventional materials.

The present inventors have conducted intensive studies in an attempt to achieve the aforementioned object. As a result, they have found that a blue-colored composition containing a copper phthalocyanine pigment and a dioxazine violet pigment at a specific ratio is capable of producing a blue filter which can satisfy the blue color characteristic defined in the EBU Standard, with a film thickness of 2.5 µm or less. The present invention is based on this finding.

It has been also found by the present inventors that it is possible to obtain a color liquid crystal display device exhibiting the color characteristics as defined by the EBU Standard by combining a color filter of the invention with a backlight unit, having a three band fluorescent lamp as a light source, which emits a backlight having a specific light intensity distribution.

Accordingly, the present invention provides a color filter having a thickness of from 1 to 2.5 µm and comprising at least one red filter segment, at least one green filter segment, and at least one blue filter segment, the one blue filter segment being prepared from prepared from a blue-colored composition containing a colorant carrier selected from the group consisting of a transparent resin, a precursor of a transparent resin and a mixture thereof, and a blue colorant dispersed in the carrier and consisting of a copper phthalocyanine pigment and a dioxazine violet pigment, wherein a content of the dioxazine violet pigment is from 0.5% to 7% by weight based on the total weight of the blue colorant.

Further, there is provided according to the present invention a color liquid crystal display device comprising a color filter of the present invention; and a backlight unit having a three-band fluorescent lamp as a light source; wherein a distribution I(λ) of light intensity of backlight emitted from the backlight unit relative to wavelength satisfies the following conditions:

$$0.35 \leq \alpha \leq 0.5$$

where α is:

$$\alpha = \sum_{\lambda=400}^{700} I(\lambda) \cdot \bar{z}(\lambda) \bigg/ \sum_{\lambda=400}^{700} I(\lambda) \cdot \{\bar{x}(\lambda) + \bar{y}(\lambda) + \bar{z}(\lambda)\}$$

wherein λ is wavelength; $\bar{x}(\lambda)$, $\bar{y}(\lambda)$ and $\bar{z}(\lambda)$ are color matching functions of the XYZ color specification system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The color filter of the present invention includes at least one red filter segment, at least one green filter segment, and at least one blue filter segment. The color filter has a thickness of from 1 to 2.5 µm, preferably 1–2 µm.

The blue filter segment is prepared from a blue-colored composition according to the present invention. The blue-colored composition contains a colorant carrier selected from the group consisting of a transparent resin, a precursor of a transparent resin and a mixture thereof, and a blue colorant dispersed in the colorant carrier. The blue colorant consists of a copper phthalocyanine pigment and a dioxazine violet pigment. The colorant carrier provides a resinous binder in the resultant blue filter segment layer.

The copper phthalocyanine pigment used in the present invention includes crystalline copper phthalocyanine pigments such as α type, β type and ε type. Among them, ε type copper phthalocyanine pigment (C.I. Pigment Blue 15:6) is most preferable, since the maximum transmission wavelength thereof is located at the shortest wavelength side among them. In particular, not less than 80% by weight of the copper phthalocyanine pigment used should preferably be constituted by C.I. Pigment Blue 15:6. If the ratio of the C.I. Pigment Blue 15:6 is less than 80% by weight of the copper phthalocyanine pigment, the y value becomes larger, so that it may sometimes become difficult to make the y value meet the EBU Standard, i.e. y=0.06.

The dioxazine violet pigment constituting the blue colorant of the invention together with the copper phthalocyanine pigment functions, when added in a small amount to the copper phthalocyanine pigment, to minimize the y value without necessitating to increase the film thickness of the blue color filter. A preferable example of the dioxazine violet pigment is C.I. Pigment Violet 23.

In the present invention, the content of dioxazine violet pigment is within the range of 0.5 to 7%, preferably 3 to 7% by weight based on the total weight of the blue colorant (copper phthalocyanine pigment+dioxazine violet pigment). When the content of dioxazine violet pigment is less than 0.5% by weight, a resultant blue-colored composition is difficult to form a blue color filter having a film thickness of 2.5 µm or less while satisfying the color characteristics defined by the EBU Standard. On the other hand, if the content of dioxazine violet pigment exceeds 7% by weight, the x value of the chromaticity coordinates of a blue filter prepared from a resultant coloring composition exceeds the value of 0.15 as defined by the EBU Standard. Preferably, the content of dioxazine violet pigment in the blue colorant does not exceed 6% by weight.

As described above, the colorant carrier dispersing the blue colorant of the invention therein is constituted by a transparent resin, a precursor of a transparent resin, or a mixture thereof. The transparent resin is a resin exhibiting a transmittance of, preferably, not less than 80%, more preferably, not less than 95% in the entire wavelength region of the visible light region, i.e., the wavelength ranging from 400 to 700 nm. The transparent resin includes a thermoplastic resin, a thermosetting resin and a photo-sensitive resin. The precursor of the transparent resin includes a monomer and oligomer which is capable of producing a transparent resin when cured by the irradiation of radiation. These transparent resin and precursor may be used singly or in combination of two or more of these.

If the composition of the present invention is to be cured by the irradiation of ultraviolet rays, a photo-initiator may be added to the composition.

Examples of the thermoplastic resin include, for example, butyral resins, styrene-maleic acid copolymers, chlorinated polyethylenes, chlorinated polypropylenes, polyvinyl chlorides, vinyl chloride-vinyl acetate copolymers, polyvinyl acetates, polyurethane resins, phenolic resins, polyester resins, acrylic resins, alkyd resins, styrene resins, polyamide resins, rubber resins, cyclized rubbers, celluloses, polybutadienes, and polyimide resins. Examples of the thermosetting resin include, for example, epoxy resins, benzoguanamine resins, melamine resins, and urea resins.

Examples of the photo-sensitive resin include those reaction products of linear polymers having a reactive substituent group such as hydroxyl group, carboxyl group and/or amino group with a compound, e.g., (metha)acrylic compound or cinnamic acid having a reactive substituent such as isocyanate group, aldehyde group and/or epoxy group to introduce a photo-crosslinkable group such as (metha) acryloyl group and/or styril group in the linear polymers. It is also possible to employ, as a photo-sensitive resin, a half-esterified product of a linear polymer containing an acid anhydride such as styrene-maleic anhydride copolymer or α-olefin-maleic anhydride copolymer with a (metha)acrylic compound having hydroxyl group such as hydroxyalkyl (metha)acrylate.

Examples of the monomer and oligomer include acrylic acid esters and methacrylic acid esters such as 2-hydroxyethyl (metha)acrylate, 2-hydroxypropyl (metha) acrylate, cyclohexyl (metha)acrylate, polyethylene glycol di(metha)acrylate, pentaerythritol tri(metha)acrylate, dipentaerythritol hexa(metha)acrylate, tricyclodecanyl (metha) acrylate, melamine (metha)acrylate and epoxy (metha) acrylate; (metha)acrylic acid; styrene; vinyl acetate; (metha) acryl amide; N-hydroxymethyl (metha)acryl amide; and acrylonitrile.

Examples of the photo-initiator include acetophenone-based photo-initiators such as 4-phenoxydichloroacetophenone, 4-t-butyl-dichloroacetophenone, diethoxyacetophenone, 1-(4-isopropylphenyl)-2-hydroxy-2-methylpropan-1-one, 1-hydroxycyclohexylphenyl ketone, and 2-benzyl-2-dimethylamino-1-(4-morpholinophenyl)-butan-1-one; benzoin-based photo-initiators such as benzoin, benzoin methyl ether, benzoin ethyl ether, benzoin isopropyl ether, and benzyldimethyl ketal; benzophenone-based photo-initiators such as benzophenone, benzoyl benzoic acid, methyl benzoylbenzoate, 4-phenyl benzophenone, hydroxybenzophenone, acrylic benzophenone, and 4-benzoyl-4'-methyldiphenyl sulfide; thioxanthone-based photo-initiators such as thioxanthone, 2-chlorothioxanthone, 2-methylthioxanthone, isopropylthioxanthone, and 2,4-diisopropylthioxanthone; triazine-based photo-initiators such as 2,4,6-trichloro-s-triazine, 2-phenyl-4,6-bis (trichloromethyl)-s-triazine, 2-(p-methoxyphenyl)-4,6-bis (trichloromethyl)-s-triazine, 2-(p-tolyl)-4,6-bis (trichloromethyl)-s-triazine, 2-pipenyl-4,6-bis (trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis (trichloromethyl)-s-triazine, 2,4-trichloromethyl-(piperonyl)-6-triazine, and 2,4-trichloromethyl-(4'-methoxystyryl)-6-triazine; carbazole-based photo-initiators; and imidazole-based photo-initiators.

The aforementioned photo-initiators can be employed singly or in combination, and may be also used together with a sensitizer such as α-acyloxim ester, acylphosphine oxide, methylphenyl glyoxylate, benzil, 9,10-phenanthrene quinone, camphor quinone, ethylanthraquinone, 4,4'-diethylisophthalophenone, 3,3',4,4'-tetra(t-butyl peroxycarbonyl)benzophenone, or 4,4'-diethyl aminobenzophenone.

The blue-colored composition of the present invention can be produced by mixing a copper phthalocyanine pigment and a dioxazine violet pigment together at the aforementioned ratio to prepare the blue colorant, which is then finely dispersed in a colorant carrier in a known manner, if required, together with any of the aforementioned photo-initiators. Alternatively, the composition of the present invention can be produced by separately dispersing a copper phthalocyanine pigment and a dioxazine violet pigment in colorant carrier respectively. The resultant dispersions are then mixed together such that the content of the dioxazine violet pigment satisfies the aforementioned ratio according to the present invention.

In order to facilitate the application of the composition of the present invention onto a transparent substrate to have a thickness of 1–2.5 µm when dried, to form blue color filter segments, the composition may contain a solvent. Such a solvent includes cyclohexanone, ethylene glycol monoethyl ether acetate, ethylene glycol monobutyl ether acetate, 1-methoxy-2-propyl acetate, diethyleneglycol dimethyl ether, ethyl benzene, ethyleneglycol diethyl ether, xylene, ethylene glycol monoethyl ether, methyl-n-amyl ketone, propyleneglycol monomethylether, toluene, methylethyl ketone, ethyl acetate, methanol, ethanol, isopropyl alcohol, butanol, isobutyl ketone, and petroleum-based solvents. These solvents may be employed singly or in combination.

The blue-colored composition of the present invention can be formulated as a printing ink for gravure offset, a printing ink for water-less offset, a printing ink for silk screen printing, or a solvent development type or alkali development type blue-colored resist material. The colored resist material can be prepared by dispersing the blue colorant of the invention in a composition comprising a monomer, a photosensitive initiator, and a resin selected from the group consisting of a thermoplastic resin, a thermosetting resin and a photo-sensitive resin.

The blue colorant of the present invention should preferably be contained in the blue-colored composition of the present invention in an amount of 1.5 to 7% by weight when the filter segment is formed by photolithography, and in an amount of 1.5 to 40% by weight when each filter segment is formed by an printing method, based on the total weight of the composition. In any event, it is preferred that the blue colorant is contained in the finished blue filter segment in an amount of 10%–40% by weight, more preferably 20%–40% by weight, with the balance being substantially a transparent resinous binder provided by the colorant carrier.

The composition of the present invention should preferably be subjected to a centrifugal separation or a filtering using a sintered filter or a membrane filter before use so as to remove coarse particles having a particle diameter of 5 $\mu$m or more, more preferably 1 $\mu$m or more, most preferably 0.5 $\mu$m or more and other foreign matters or dusts that have been mixed thereinto.

A color filter according to the present invention comprises at least one red filter segment, at least one green filter segment, and at least one blue filter segment as mentioned previously. The blue filter segment is formed using the blue-colored composition of the present invention. The red filter segment and the green filter segment can be formed by using a conventional red-colored composition and a conventional green-colored composition, respectively. More preferably, a red-colored composition which is capable of providing red color filter segments satisfying the EBU Standard even if the film thickness thereof is as thin as 1 to 2.5 $\mu$m is a composition the same as the composition of the invention except that a mixture of e.g., C.I. Pigment Red 254 and C.I. Pigment Red 177 is used instead of the blue colorant of the invention. Use may be made of C.I. Pigment Reds 7; 14; 41; 48:1; 48:2; 48:3; 48:4; 146; 178; 184; 185; 187; 200; 202; 208; 210; 246; 255; 264; and 272 as a red pigment. A green-colored composition which is capable of providing a green color filter segment satisfying the EBU Standard even if the film thickness thereof is as thin as 1 to 2.5 $\mu$m is a composition the same as the composition of the invention except that a mixture of C.I. Pigment Green 36 and a yellow pigment selected from C.I. Pigment Yellow 150, C.I. Pigment Yellow 139 and C.I. Pigment Yellow 13 is used instead of the blue colorant of the invention.

The color filter according to this invention can be formed on a transparent substrate by means of a printing method or a photolithography.

The transparent substrate includes a glass substrate or a plastic substrate formed of a resin such as polycarbonate, polymethylmethacrylate or polyethylene terephthalate.

The formation of each filter segment by means of a printing method is advantageous in that since the patterning of the filter segment can be achieved by simply repeating the printing process of a colored composition prepared as a printing ink for each color, which is followed by the drying process, the color filter can be manufactured at low cost and with excellent mass-productivity. Additionally, owing to the development of printing technique in recent years, it is now possible to perform a printing of fine pattern which is excellent in dimensional precision and also in flatness.

For the purpose of printing, the ink composition should preferably be formulated such that the ink can be hardly dried or cured on the form plate or on the blanket. Further, since the swelling or dissolution of blanket gives rise to the deterioration of reproducibility of pattern or the deterioration of transparency of the filter segment, the solvent for the printing ink should be carefully selected. Further, the controlling of the fluidity of ink on the printing machine is also important. The adjustment of viscosity of ink can be performed by using a dispersant or an extender pigment.

If each color filter segment is to be formed by means of a photolithography, a colored composition which has been formulated into a solvent development type or alkali development type colored resist material is coated on a transparent substrate to a thickness of 1 to 2.5 $\mu$m, preferably 1 to 2 $\mu$m (dry thickness) by means of coating method such as spray coating, spin coating or roll coating to form a film. After being dried if required, the film is exposed to ultraviolet ray through a mask having a predetermined pattern and disposed in contact with or non-contacted with the film. Thereafter, the film is dipped in a solvent or an alkaline developing solution or sprayed with a developing solution so as to remove the uncured portion of the film, thereby forming a pattern. The same procedures are repeated for the formation of pattern of other colors, thereby manufacturing the color filter. In these procedures, heating may be applied for the purpose of promoting the polymerization of the colored resist material.

In development, an aqueous solution of sodium carbonate or sodium hydroxide may be employed as an alkaline developing solution. It is also possible to employ an organic alkali such as dimethylbenzyl amine or triethanol amine. It is also possible to incorporate an antifoaming agent or a surfactant into the developing solution.

After the coating and drying of the colored resist material, a film for preventing deterioration by oxygen may be deposited thereon by coating and drying a water-soluble or alkali-soluble resin such as polyvinyl alcohol or a water-soluble acrylic resin before the irradiation with ultraviolet ray for the purpose of improving the sensitivity of the film to ultraviolet ray.

The color characteristics of a color liquid crystal display device comprising a color filter and a backlight unit mainly depend on the transmission spectrum of the color filter and also on the characteristic of the backlight passing through the color filter, and is determined by the product of the distribution in intensity of the spectrum of the backlight and the distribution of transmission spectrum of the color filter. Further, this color characteristics can be represented by coordinates such as (X, Y, Z) or (L*, a*, b*) on the basis of human visual characteristics. In the technical fields of color television and liquid crystal display device, the chromaticity is frequently expressed by (x, y), and three primary colors constituting standard colors in NTSC and EBU are also expressed by (x, y).

The relationship among the distribution I($\lambda$) of wavelength of energy of the light source, the transmission spectrum T($\lambda$) of the color filter, the color matching functions $\bar{x}(\lambda)$, $\bar{y}(\lambda)$ and $\bar{z}(\lambda)$ representing the human visual characteristics, and the chromaticity (x, y) can be expressed as follows.

$$X = K\int I(\lambda) \cdot T(\lambda) \cdot \bar{x}(\lambda) d\lambda$$

$$Y = K\int I(\lambda) \cdot T(\lambda) \cdot \bar{y}(\lambda) d\lambda$$

$$Z = K\int I(\lambda) \cdot T(\lambda) \cdot \bar{z}(\lambda) d\lambda$$

$$K = \frac{1}{\int I(\lambda) \cdot T(\lambda) d\lambda}$$

$$(x, y) = \left( \frac{X}{X+Y+Z}, \frac{Y}{X+Y+Z} \right)$$

where $\lambda$ is a wavelength.

A color liquid crystal display device according to the present invention has the color filter of the invention and a backlight unit having a three band fluorescent lamp as a light source. In the present invention, a distribution $I(\lambda)$ of the light intensity of backlight emitted from the backlight unit relative to wavelength satisfies the following conditions:

$$0.35 \leq \alpha \leq 0.5$$

where $\alpha$ is:

$$\alpha = \sum_{\lambda=400}^{700} I(\lambda) \cdot \bar{z}(\lambda) \Big/ \sum_{\lambda=400}^{700} I(\lambda) \cdot \{\bar{x}(\lambda) + \bar{y}(\lambda) + \bar{z}(\lambda)\}$$

wherein $\lambda$ is wavelength; $\bar{x}(\lambda)$, $\bar{y}(\lambda)$ and $\bar{z}(\lambda)$ are color matching functions of the XYZ color specification system.

It is important that the color purity of blue according to the EBU Standard is high, i.e., when x has the predetermined value, the value of y is small. Therefore, the curve of the color matching functions $\bar{z}(\lambda)$ is required to be overlapped, to a large extent, with the transmission spectrum of the blue color filter. Here, $\alpha$ is a parameter representing the shape of the energy distribution of the backlight, and corresponds to the ratio of overlapping with the color matching function $\bar{z}(\lambda)$ among the energy in the visual region of backlight. Therefore, by setting this $\alpha$ value to fall within the aforementioned range, the backlight corresponding to this $\alpha$ value properly conforms with the EBU Standard.

At present, the three band lamp is predominantly employed as a light source of the backlight. The emission spectrum of the three band lamp is determined by the kinds, mixing ratio and coating method of phosphors emitting red, green and blue lights, respectively. In a color liquid crystal display device, the three band lamp is built in the backlight unit. In this case, the light emitted from the light source is allowed to pass through a light guide plate and a diffusion plate so as to form a plane luminous body exhibiting a uniform luminance throughout the entire faceplate of the display device. Note that, when the light is allowed to pass through the light guide plate and the diffusion plate, the intensity of light source on the short wavelength side of the spectrum is generally weakened due to, e.g., the scattering of light. Therefore, the above-mentioned conditions required for the backlight in the present invention is not directed to the emission spectrum of the three band lamp itself, but is directed to the emission spectrum of light introduced into the liquid crystal display device after emitted from the backlight unit.

The value of $\alpha$ corresponds to a component which will be exerted on blue color among the emission energy of the backlight, so that the higher the value of $\alpha$ is, the higher the ratio of the component contributing to blue color would become. Therefore, the higher the value of $\alpha$ is, the more easy it becomes to reproduce blue color on the display, i.e., the smaller the value of $\alpha$ is, the more difficult it becomes to reproduce blue color on the display. Thus, when the value of $\alpha$ is less than 0.35, it will become impossible to obtain blue color which substantially meets the EBU Standard. Namely, when all of red, green and blue colors are ON in the color liquid crystal display, the synthesis (additive color mixing) of the three colors is required to be white. However, when the value of $\alpha$ is less than 0.35, the blue component becomes smaller, so that white becomes yellowish, a complementary color of blue. If it is desired to correct this phenomenon, the transmittance of green and red of the color filter is required to be lowered, resulting in an image plane which is low in utilization efficiency of backlight and in brightness. Therefore, the value of $\alpha$ is required to be not less than 0.35, more preferably not less than 0.4.

On the other hand, when the value of $\alpha$ exceeds 0.5, the transmittance of the blue color filter is required to be lowered, thus also resulting in an image plane which is low in brightness. Therefore, the value of $\alpha$ is required to be not more than 0.5, more preferably not more than 0.45.

Incidentally, the chromaticity of the displayed color may be slightly changed due to the presence, in the display device, of components or elements other than the color filter, such as a polarizer. However, the chromaticity can be appropriately corrected within the scope of the present invention.

The value of $\alpha$ of the backlight can be set to fall within the aforementioned range by suitably selecting the kinds and mixing ratios of the phosphors used for the three band lamp functioning as a light source. While, a white light emission lamp can be obtained by coating a mixture of a blue-emitting phosphor, a green-emitting phosphor and a red-emitting phosphor on the tubular inner wall of the lamp, the emission spectrum of the lamp is determined by the mixing ratios of these phosphors. If the content of the blue-emitting phosphor is increased, the light emitted would become bluish, thus increasing the color temperature. On the other hand, if the content of the red-emitting phosphor is increased, the color temperature would be lowered. The color temperature of the three band lamp used as a backlight source should preferably be not less than 5000K and not higher than 30000K.

To provide such a color temperature, it is preferred to blend blue-emitting phosphor in an amount within the range of 20 to 55% by weight, a green-emitting phosphor in an amount within the range of 20 to 55% by weight, and a red-emitting phosphor in an amount within the range of 20 to 45% by weight. As a blue-emitting phosphor, it is preferred to use $Sr_5(PO_4)_3Cl$:Eu, $(SrCaBa)_5(PO_4)_3Cl$:Eu and/or $BaMg_2Al_{16}O_{27}$:Eu. As a green-emitting phosphor, it is preferred to use $LaPO_4$:Ce,Tb and/or $(CeTb)MgAl_{14}O_{19}$. As a red color-emitting phosphor, it is preferred to use $Y_2O_3$:Eu.

Figure 1:
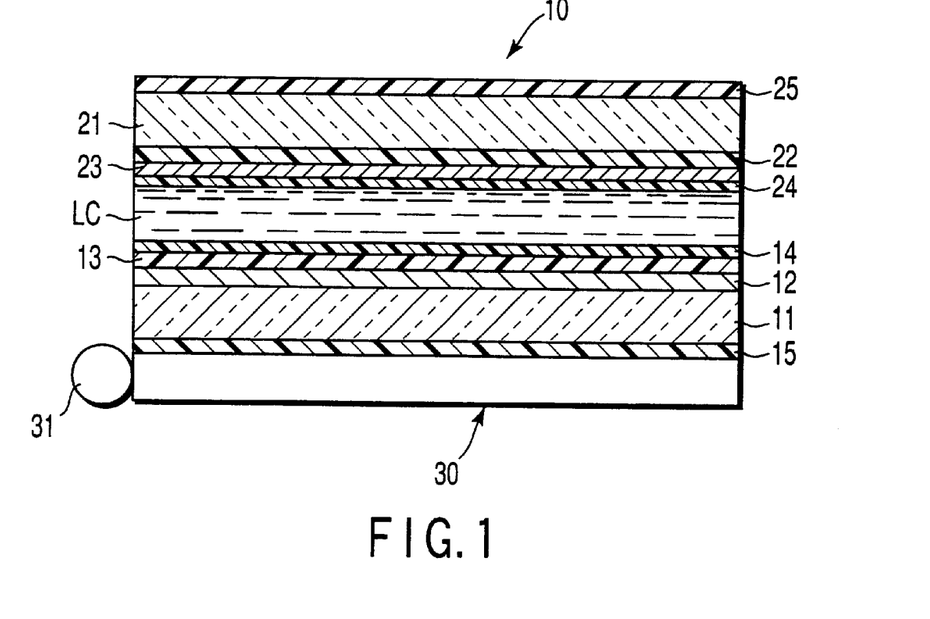
FIG. 1 is a schematic cross-sectional view of a color liquid crystal display device to which the color filter of the present invention can be applied.

FIG. 1 shows a schematic cross-sectional view of a color liquid crystal display device to which the color filter of this invention can be applied. Referring to FIG. 1, the device 10 is a representative example of a TFT drive color liquid crystal display device for use in a notebook personal computer, and is provided with a pair of transparent electrodes 11 and 21 which are disposed apart from each other with a space interposed therebetween. A liquid crystal composition (e.g., TN or STN liquid crystal composition) LC is liquid-tightly filled in the space. On the inner surface of the first substrate 11, there is formed a TFT array 12, on which a transparent electrode layer 13 comprising, e.g., ITO is formed. An alignment layer 14 is formed on this transparent electrode layer 13. Further, a polarizer 15 is attached to the outer surface of the transparent substrate 11.

On the other hand, a color filter 22 according to the present invention is formed on the inner surface of the second substrate 21. The red, green and blue filter segments constituting the color filter 22 are respectively separated by a black matrix (not shown). A transparent electrode layer 23 comprising, e.g., ITO is formed covering the color filter 22, and an alignment layer 24 is formed covering this transparent electrode layer 23. Further, a polarizer 25 is attached to the outer surface of the transparent substrate 21.

A backlight unit 30 provided with a three band lamp 31 is disposed outside the first transparent substrate 11 and closely contacted with the polarizer 15.

Figure 2:
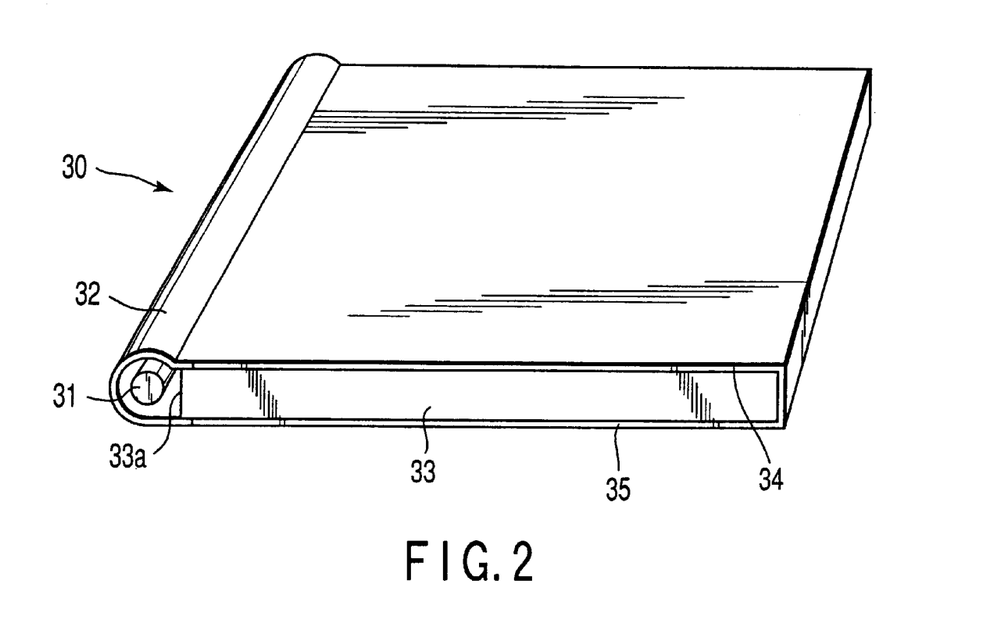
FIG. 2 is a perspective view illustrating a backlight unit which can be used for the color liquid crystal display device shown in FIG. 1.

FIG. 2 is a perspective view illustrating the backlight unit 30 shown in FIG. 1. The backlight unit 30 is provided with the three band lamp 31, a light guide plate 33 and a diffusion plate 34 formed on the upper surface of the light guide plate 33. The three band lamp 31 is disposed to face one side wall 33a of the light guide plate 33 and the full length thereof is entirely surrounded by a lamp reflector 32 except a portion which corresponds to the side wall 33a of the light guide plate 33. All sidewalls excluding one side wall 33a and bottom plane of the light guide plate 33 are covered with a reflective plate 35. The light from the three band lamp 31 is guided by the lamp reflector 32 to the light guide plate 33, and allowed to pass through the diffusion plate 34, thus turning the light into a plane-like light, which is then allowed to be introduced via the polarizing plate 15 into the liquid crystal layer LC (FIG. 1). The reflective plate 35 functions to effectively direct the light that has been introduced into the light guide plate 33 toward diffusion plate 34.

The present invention will be further explained with reference to the following examples. Firstly, backlight units, pigment dispersions and blue-colored resist materials used in these examples will be explained. Note that all "parts" are by weight.

<Backlight Unit 1>

Figure 3:
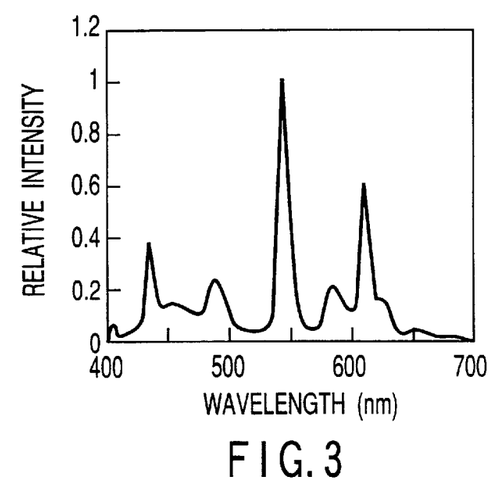
FIG. 3 is a graph showing the emission spectrum from the backlight unit 1.

31.2% by weight of $Y_2O_3$:Eu as a red-emitting phosphor, 57.0% by weight of $LaPO_4$:Ce,Tb as a green-emitting phosphor, and 11.8% by weight of $(SrCaBa)_5(PO_4)_3Cl$:Eu as a blue-emitting phosphor were mixed together by means of a mixer. The mixed phosphors were then mixed into butyl acetate in which nitrocellulose was dissolved in advance. The resultant mixture was sufficiently mixed to form a suspension, which was then coated on the inner surface of a glass tube having an inner diameter of 32 mm and dried. Thereafter, the coated layer was baked at a temperature of 500° C. to prepare a linear fluorescent lamp of 40 W. Using this fluorescent lamp, a backlight unit 1 was prepared. The emission spectrum from the backlight unit 1 was as shown in FIG. 3. The α value was 0.27.

<Backlight Unit 2>

Figure 4:
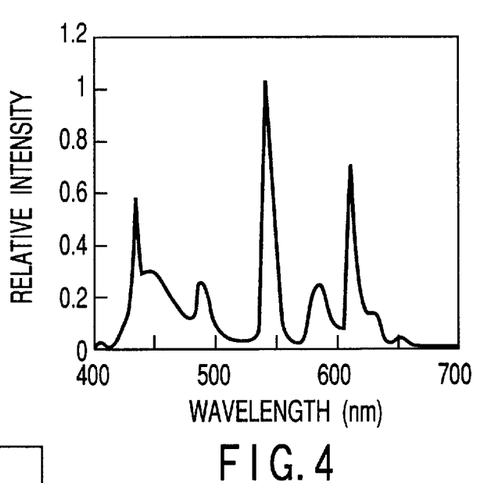
FIG. 4 is a graph showing the emission spectrum from the backlight unit 2.

40% by weight of $Y_2O_3$:Eu as a red-emitting phosphor, 25% by weight of $LaPO_4$:Ce,Tb as a green-emitting phosphor, and 35% by weight of $(SrCaBa)_5(PO_4)_3Cl$:Eu as a blue-emitting phosphor were mixed together by means of a mixer. The mixed phosphors were then mixed into butyl acetate in which nitrocellulose was dissolved in advance. The resultant mixture was sufficiently mixed to form a suspension, which was then coated on the inner surface of a glass tube having an inner diameter of 32 mm and dried. Thereafter, the coated layer was baked at a temperature of 500° C. to prepare a linear fluorescent lamp of 40 W. This fluorescent lamp was substituted for the fluorescent lamp of the backlight unit 1, thereby preparing a backlight unit 2. The emission spectrum from the backlight unit 2 was as shown in FIG. 4. The α value was 0.39.

<Backlight Unit 3>

Figure 5:
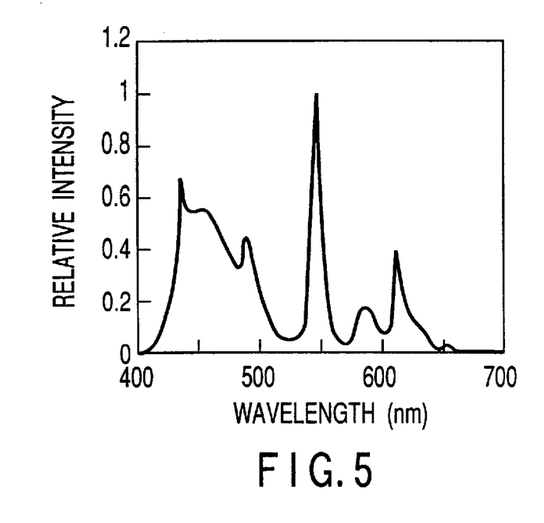
FIG. 5 is a graph showing the emission spectrum from the backlight unit 3.

25% by weight of $Y_2O_3$:Eu as a red-emitting phosphor, 25% by weight of $LaPO_4$:Ce,Tb as a green-emitting phosphor, and 50% by weight of $Sr_5(PO_4)_3Cl$:Eu as a blue-emitting phosphor were mixed together by means of a mixer. The mixed phosphors were then mixed into butyl acetate in which nitrocellulose was dissolved in advance. The resultant mixture was sufficiently mixed to form a suspension, which was then coated on the inner surface of a glass tube having an inner diameter of 32 mm and dried. Thereafter, the coated layer was baked at a temperature of 500° C. to prepare a linear fluorescent lamp of 40 W. This fluorescent lamp was substituted for the fluorescent lamp of the backlight unit 1, thereby preparing a backlight unit 3. The emission spectrum from the backlight unit 3 was as shown in FIG. 5. The α value was 0.54.

Next, the method of preparing dispersions of a copper phthalocyanine and a dioxazine violet will be described. Note that the acrylic varnish employed was a 20 wt. % cyclohexanone solution of acrylic resin having a molecular weight of about 40000, wherein the monomer composition thereof was styrene/methacrylic acid/methylmethacrylate/butylmethacrylate=20/20/30/30 (weight ratio).

<Dispersion of Copper Phthalocyanine Pigment>

A mixture having the following composition was uniformly mixed together, and then dispersed for 5 hours by means of a sand mill using glass beads each having a diameter of 1 mm, after which the resultant dispersed mixture was filtered using a 5 μm filter to prepare a dispersion of copper phthalocyanine.

| | |
|---|---|
| ε type copper phthalocyanine (C.I. Pigment Blue 15:6) ("Lionel Blue ES", Toyo Ink Manufacturing Co., Ltd.) | 60 parts |
| Dispersant (Avecia Co., Ltd. "Solsperse 20000") | 6 parts |
| Acrylic varnish | 200 parts |
| Cyclohexanone | 134 parts |

<Dispersion of Dioxazine Violet Pigment>

A mixture having the following composition was uniformly mixed together, and then dispersed for 5 hours by means of a sand mill using glass beads each having a diameter of 1 mm, after which the resultant dispersed mixture was filtered using a 5 μm filter to prepare a dispersion of dioxazine violet.

| | |
|---|---|
| Dioxazine violet (C.I. Pigment Violet 23) ("Linogen Violet", Toyo Ink Manufacturing Co., Ltd.) | 60 parts |
| Dispersant (Avecia Co., Ltd. "Solsperse 20000") | 6 parts |
| Acrylic varnish | 200 parts |
| Cyclohexanone | 134 parts |

Next, by using these dispersions, the ratio between the copper phthalocyanine and the dioxazine violet was varied to prepare the following blue-colored resist material.

<Blue-colored Resist Material 1>

A mixture having the following composition was uniformly mixed together, and then subjected to filtration using a 1 μm filter to prepare a blue-colored resist material 1 containing 2% by weight (based on the entire pigment) of dioxazine violet.

| | |
|---|---|
| Copper phthalocyanine dispersion | 190 parts |
| Dioxazine violet dispersion | 4 parts |
| Trimethylol propane triacrylate ("NK ester ATMPT, Shin-Nakamura Chemical Co., Ltd.) | 18 parts |
| Photo-initiator "Irgacure 907", Ciba-Geigy Co., Ltd.) | 4 parts |
| Sensitizer ("EAB-F", Hodogaya Chemical Co., Ltd.) | 2 parts |
| Cyclohexanone | 200 parts |

<Blue-colored Resist Material 2>

A blue-colored resist material 2 containing 4% by weight (based on the entire pigment) of dioxazine violet was prepared in the same manner as that of the blue-colored resist material 1 except that the content of the copper phthalocyanine dispersion was changed to 186 parts, and the content of the dioxazine violet dispersion was changed to 8 parts.

<Blue-colored Resist Material 3>

A blue-colored resist material 3 containing 6% by weight (based on the entire pigment) of dioxazine violet was prepared in the same manner as that of the blue-colored resist material 1 except that the content of the copper phthalocyanine dispersion was changed to 182 parts, and the content of the dioxazine violet dispersion was changed to 12 parts.

<Blue-colored Resist Material 4>

A blue-colored resist material 4 containing 8% by weight (based on the entire pigment) of dioxazine violet was prepared in the same manner as that of the blue-colored resist material 1 except that the content of the copper phthalocyanine dispersion was changed to 178 parts, and the content of the dioxazine violet dispersion was changed to 16 parts.

<Blue-colored Resist Material 5>

A blue-colored resist material 5 containing 0.5% by weight (based on the entire pigment) of dioxazine violet was prepared in the same manner as that of the blue-colored resist material 1 except that the content of the copper phthalocyanine dispersion was changed to 193 parts, and the content of the dioxazine violet dispersion was changed to 1 part.

<Blue-colored Resist Material 6>

A blue-colored resist material 6 containing no dioxazine violet was prepared in the same manner as that of the blue-colored resist material 1 except that the content of the copper phthalocyanine dispersion was changed to 194 parts, and the content of the dioxazine violet dispersion was changed to 0 part.

Green-colored resist material and red-colored resist material each having the following compositions were prepared in the same manner as that of the blue-colored resist material.

| <Green-colored resist material> | |
|---|---|
| Green pigment (C.I. Pigment Green 36) ("Lionel Green 6YK", Toyo Ink Manufacturing Co., Ltd.) | 11 parts |
| Yellow pigment (C.I. Pigment Yellow 150) ("Fanchon Fast Yellow Y-5688", Bayer Co., Ltd.) | 8 parts |
| Acrylic varnish | 102 parts |
| Trimethylol propane triacrylate ("NK ester ATMPT, Shin-Nakamura Chemical Co., Ltd.) | 14 parts |
| Photo-initiator ("Irgacure 907", Ciba-Geigy Co., Ltd.) | 4 parts |
| Sensitizer ("EAB-F", Hodogaya Chemical Co., Ltd.) | 2 parts |
| Cyclohexanone | 257 parts |

-continued

| <Red-colored resist material> | |
|---|---|
| Reg pigment (C.I. Pigment Red 254) ("Irga for Red B-CF", Ciba-Geigy Co., Ltd.) | 18 parts |
| Red pigment (C.I. Pigment Red 177) ("Chromophthal Red A2B", Ciba-Geigy Co., Ltd.) | 2 parts |
| Acrylic varnish | 108 parts |
| Trimethylol propane triacrylate ("NK ester ATMPT, Shin-Nakamura Chemical Co., Ltd.) | 13 parts |
| Photo-initiator ("Irgacure 907", Ciba-Geigy Co., Ltd.) | 3 parts |
| Sensitizer ("EAB-F", Hodogaya Chemical Co., Ltd.) | 1 parts |
| Cyclohexanone | 253 parts |

Each-colored resist material was coated on the surface of a glass substrate by means of a spin coating, and then dried at a temperature of 70° C. by using a hot air oven for 20 minutes. Then, the coated layer was exposed to ultraviolet ray through a photomask having a stripe-like openings each having a width of 100 $\mu$m. Thereafter, the unexposed portion was washed away with a 5% aqueous solution of sodium carbonate, after which the residual layer was baked at a temperature of 230° C. for 30 minutes to obtain a-colored filter having a stripe pattern each having a width of 100 $\mu$m. In this case, the film thickness of the color filter was set so as to make the chromaticity thereof closer to the EBU Standard.

Thereafter, a transparent ITO electrode layer was formed on the color filter thus prepared, and a polyimide alignment layer was formed on the electrode layer. Then, a polarizer layer was formed on the other surface of the glass substrate. On the other hand, a TFT array and a pixel electrode were formed on one surface of a second glass substrate, and a polarizer layer was formed on the other surface of the second glass substrate. The two glass substrates were opposed with a space therebetween such that the electrode layers face each other, and accurately positioned while the space was maintained constant by using spacer beads. Then the substrates were sealed at their peripheries with a sealant except for a portion (opening) for loading a liquid crystal composition. The liquid crystal composition was loaded through the opening, which was then sealed. In this way, a color liquid crystal display device was fabricated. The display device was combined with each backlight unit prepared above to prepare a color liquid crystal display panel. The color characteristics displayed on the panel were measured. Results are shown in Table 1 below. In Table 1, Y denotes the lightness of the displayed color. Generally, a color filter has better color characteristics when the reproducing color region is larger and the lightness of the color is higher. Usually, the color density of a color filter becomes higher when the thickness of the filter is increased, with the result that the reproducing color region is enlarged, and the lightness Y is decreased. Thus, with the same reproducing color region, the larger the value of Y is, the better the color characteristics of the color filter are.

TABLE 1

| | Blue-Colored Resist | Backlight Unit | α | RED x | y | z |
|---|---|---|---|---|---|---|
| Example 1 | 2 | 2 | 0.39 | 0.640 | 0.330 | 7.2 |
| Example 2 | 3 | 2 | 0.39 | 0.640 | 0.330 | 7.2 |
| Example 3 | 1 | 2 | 0.39 | 0.640 | 0.330 | 7.2 |
| Example 4 | 5 | 2 | 0.39 | 0.640 | 0.330 | 7.2 |

TABLE 1-continued

| | | | | | | |
|---|---|---|---|---|---|---|
| Comparative Example 1 | 2 | 1 | 0.27 | 0.640 | 0.330 | 7.6 |
| Comparative Example 2 | 4 | 2 | 0.39 | 0.640 | 0.330 | 7.2 |
| Comparative Example 3 | 2 | 3 | 0.54 | 0.640 | 0.330 | 4.0 |
| Comparative Example 4 | 6 | 2 | 0.39 | 0.640 | 0.330 | 7.2 |
| EBU Standard | | | | 0.640 | 0.330 | — |

| | GREEN | | | BLUE | | | Film Thickness ($\mu$m) | | |
|---|---|---|---|---|---|---|---|---|---|
| | x | y | Y | x | y | Y | R | G | B |
| Example 1 | 0.290 | 0.600 | 18.3 | 0.149 | 0.060 | 2.4 | 1.60 | 1.59 | 1.77 |
| Example 2 | 0.290 | 0.600 | 18.3 | 0.150 | 0.060 | 2.4 | 1.60 | 1.59 | 1.66 |
| Example 3 | 0.290 | 0.600 | 18.3 | 0.147 | 0.060 | 2.4 | 1.60 | 1.59 | 2.10 |
| Example 4 | 0.290 | 0.600 | 18.3 | 0.144 | 0.060 | 2.4 | 1.60 | 1.59 | 2.43 |
| Comparative Example 1 | 0.290 | 0.600 | 19.9 | 0.140 | 0.060 | 1.2 | 1.38 | 1.34 | 2.88 |
| Comparative Example 2 | 0.290 | 0.600 | 18.3 | 0.152 | 0.060 | 2.2 | 1.60 | 1.59 | 1.22 |
| Comparative Example 3 | 0.290 | 0.600 | 18.4 | 0.143 | 0.060 | 4.3 | 2.05 | 1.99 | 1.63 |
| Comparative Example 4 | 0.290 | 0.600 | 18.3 | 0.144 | 0.060 | 2.4 | 1.60 | 1.59 | 2.60 |
| EBU Standard | 0.290 | 0.600 | — | 0.150 | 0.060 | — | | | |

As explained above, it has become possible according to the present invention to form a blue color filter segment having a film thickness of not more than 2.5 $\mu$m and satisfying the color characteristics as defined by the EBU Standard. As a result, it is now possible to obtain a color liquid crystal display device which is capable of satisfying the EBU Standard in terms of the chromaticity characteristics.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color liquid crystal display device comprising:
a color filter having a thickness of from 1 to 2.5 $\mu$m, and comprising at least one red filter segment, at least one green filter segment, and at least one blue filter segment, said at least one blue filter segment being prepared from a blue-colored composition comprising a colorant carrier selected from the group consisting of a transparent resin, a precursor of a transparent resin and a mixture thereof and a blue colorant dispersed in said colorant carrier and consisting of a copper phthalocyanine pigment and a dioxazine violet pigment wherein a content of said dioxazine violet pigment is from 0.5% to 7% by weight based on the total weight of said blue colorant; and a backlight unit having a three-band fluorescent lamp as a light source;

wherein a distribution $I(\lambda)$ of light intensity of backlight emitted from said backlight unit relative to wavelength satisfies the following conditions:

$$0.35 \leq \alpha \leq 0.5$$

where $\alpha$ is:

$$\alpha = \sum_{\lambda=400}^{700} I(\lambda) \cdot \bar{z}(\lambda) \Big/ \sum_{\lambda=400}^{700} I(\lambda) \cdot \{\bar{x}(\lambda) + \bar{y}(\lambda) + \bar{z}(\lambda)\}$$

wherein $\lambda$ is wavelength; and $\bar{x}(\lambda)$, $\bar{y}(\lambda)$, and $\bar{z}(\lambda)$ are color matching functions of the XYZ color specification system.

2. The device according to claim 1, wherein said dioxazine violet pigment is C.I. Pigment Violet 23.

3. The device according to claim 1, wherein not less than 80% by weight of said copper phthalocyanine pigment is constituted by C.I. Pigment Blue 15:6.

4. The device according to claim 1, which has a thickness of from 1 to 2 $\mu$m.

5. The device according to claim 1, wherein the content of said dioxazine violet pigment is from 3% to 7% by weight based on the total weight of said blue colorant.

6. The device according to claim 1, wherein said blue color filter segment contains a transparent resinous binder provided by said colorant carrier, and from 10% to 40% by weight of said blue colorant.

7. The device according to claim 1, wherein said fluorescent lamp is provided with a phosphor layer containing 20 to 55% by weight of at least one blue-emitting phosphor selected from the group consisting of $Sr_5(PO_4)_3Cl:Eu$, $(SrCaBa)_5(PO_4)_3Cl:Eu$, and $BaMg_2Al_{16}O_{27}:Eu$, 20 to 55% by weight of at least one green-emitting phosphor selected from the group consisting of $LaPO_4:Ce$, Tb, and $(CeTb)MgAl_{14}O_{19}$, and 20 to 45% by weight of red-emitting phosphor formed of $Y_2O_3:Eu$.

* * * * *